(12) United States Patent
Wang

(10) Patent No.: US 10,148,900 B2
(45) Date of Patent: Dec. 4, 2018

(54) CONTROLLING ONE OR MORE SOURCE TERMINALS BASED ON REMOTE CONTROL INFORMATION

(71) Applicant: Alibaba Group Holding Limited, George Town (KY)

(72) Inventor: Guonai Wang, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/798,873

(22) Filed: Jul. 14, 2015

(65) Prior Publication Data
US 2016/0021327 A1 Jan. 21, 2016

(30) Foreign Application Priority Data

Jul. 16, 2014 (CN) .......................... 2014 1 0338846

(51) Int. Cl.
| | |
|---|---|
| *G05B 11/01* | (2006.01) |
| *H04N 5/44* | (2011.01) |
| *H04N 21/41* | (2011.01) |
| *H04N 21/422* | (2011.01) |
| *H04N 21/436* | (2011.01) |

(52) U.S. Cl.
CPC ....... *H04N 5/4403* (2013.01); *H04N 21/4113* (2013.01); *H04N 21/42219* (2013.01); *H04N 21/43615* (2013.01)

(58) Field of Classification Search
CPC .................................................. H04N 5/4403
USPC ...................................................... 340/12.23
See application file for complete search history.

(56) References Cited

U.S. PATENT DOCUMENTS

| | | | |
|---|---|---|---|
| 5,959,539 A | 9/1999 | Adolph et al. | |
| 6,133,847 A | 10/2000 | Yang | |
| 6,265,987 B1 | 7/2001 | Wang et al. | |
| 6,781,518 B1 | 8/2004 | Hayes et al. | |
| 6,791,467 B1 | 9/2004 | Ban-Ze'ev | |
| 6,987,462 B2 | 1/2006 | Bae et al. | |
| 7,002,462 B2 * | 2/2006 | Welch | B66B 27/00 340/286.02 |
| 7,586,398 B2 | 9/2009 | Huang et al. | |
| 7,737,862 B2 | 6/2010 | Watanabe | |
| 8,098,337 B2 | 1/2012 | Martch | |
| 9,239,837 B2 | 1/2016 | Chardon et al. | |
| 2002/0046403 A1 | 4/2002 | Kim et al. | |
| 2004/0143847 A1 | 7/2004 | Suzuki et al. | |

(Continued)

FOREIGN PATENT DOCUMENTS

| | | |
|---|---|---|
| CN | 101841639 | 9/2010 |
| CN | 102385795 | 3/2012 |
| CN | 102571512 | 7/2012 |

*Primary Examiner* — Santiago Garcia
(74) *Attorney, Agent, or Firm* — Van Pelt, Yi & James LLP

(57) ABSTRACT

Embodiments of the present application relate to a method, apparatus, and system for controlling one or more source terminals. The method includes acquiring remote control code information submitted via a remote control terminal, the remote control code information specifying an operation to be performed, determining among one or more source terminals a target source terminal corresponding to the remote control code information, and sending to the target source terminal control instruction information corresponding to the remote control code information and causing the operation to be performed on the target source terminal.

30 Claims, 5 Drawing Sheets

(56) References Cited

U.S. PATENT DOCUMENTS

| | | | |
|---|---|---|---|
| 2004/0218899 A1* | 11/2004 | Oyama | H04N 5/775 386/234 |
| 2004/0227857 A1 | 11/2004 | Mizushima et al. | |
| 2005/0017872 A1* | 1/2005 | Miyake | H04N 21/42204 340/12.3 |
| 2005/0110652 A1 | 5/2005 | Becker | |
| 2007/0019958 A1 | 1/2007 | Calhoon | |
| 2007/0185968 A1 | 8/2007 | White et al. | |
| 2007/0296552 A1 | 12/2007 | Huang | |
| 2008/0098426 A1* | 4/2008 | Candelore | H04N 5/4403 725/38 |
| 2008/0160971 A1 | 7/2008 | Jeon et al. | |
| 2009/0322550 A1* | 12/2009 | Yu | G08C 17/00 340/12.22 |
| 2010/0066919 A1* | 3/2010 | Nakajima | H04B 1/205 348/734 |
| 2011/0088070 A1* | 4/2011 | Pham | H04N 21/21 725/109 |
| 2011/0223899 A1* | 9/2011 | Hiraide | G08C 17/02 455/420 |
| 2011/0291817 A1* | 12/2011 | Maegaki | G08C 23/04 340/12.22 |
| 2012/0001724 A1 | 1/2012 | Belimpasakis et al. | |
| 2012/0026409 A1 | 2/2012 | Higuchi et al. | |
| 2012/0256737 A1 | 10/2012 | Park | |
| 2013/0031478 A1 | 1/2013 | Strober | |
| 2014/0341585 A1* | 11/2014 | Lee | G08C 17/02 398/106 |

* cited by examiner

CONTROLLING ONE OR MORE SOURCE TERMINALS BASED ON REMOTE CONTROL INFORMATION

CROSS REFERENCE TO OTHER APPLICATIONS

This application claims priority to People's Republic of China Patent Application No. 201410338846.6 entitled A METHOD AND A DEVICE FOR VIDEO CONTROL, filed Jul. 16, 2014 which is incorporated herein by reference for all purposes.

FIELD OF THE INVENTION

The present invention relates to a computer field. In particular, the present invention relates to a method, system, and apparatus for controlling one or more remote terminals.

BACKGROUND OF THE INVENTION

The development of set-top boxes, television boxes, and other source terminals has made it possible for users not only to view digital television programs on existing television sets, but also to engage in interactive digital entertainment, education, and commerce via the Internet. However, existing television sets often have multiple source devices, and each of these source devices has its own remote control. Users thus need to use each of these multiple remote controls to implement control of the corresponding device separately. The need to use multiple remote controls to implement control of the corresponding multiple devices is very inconvenient. Not only does the need for multiple remote controls increase the cost of using remote controls, but the user's interactive experience is diminished.

BRIEF DESCRIPTION OF THE DRAWINGS

Various embodiments of the invention are disclosed in the following detailed description and the accompanying drawings.

Other features, objectives, and advantages of the present invention will become more obvious in light of the detailed descriptions of the non-restrictive embodiments made with reference to the drawings below.

Figure 1:
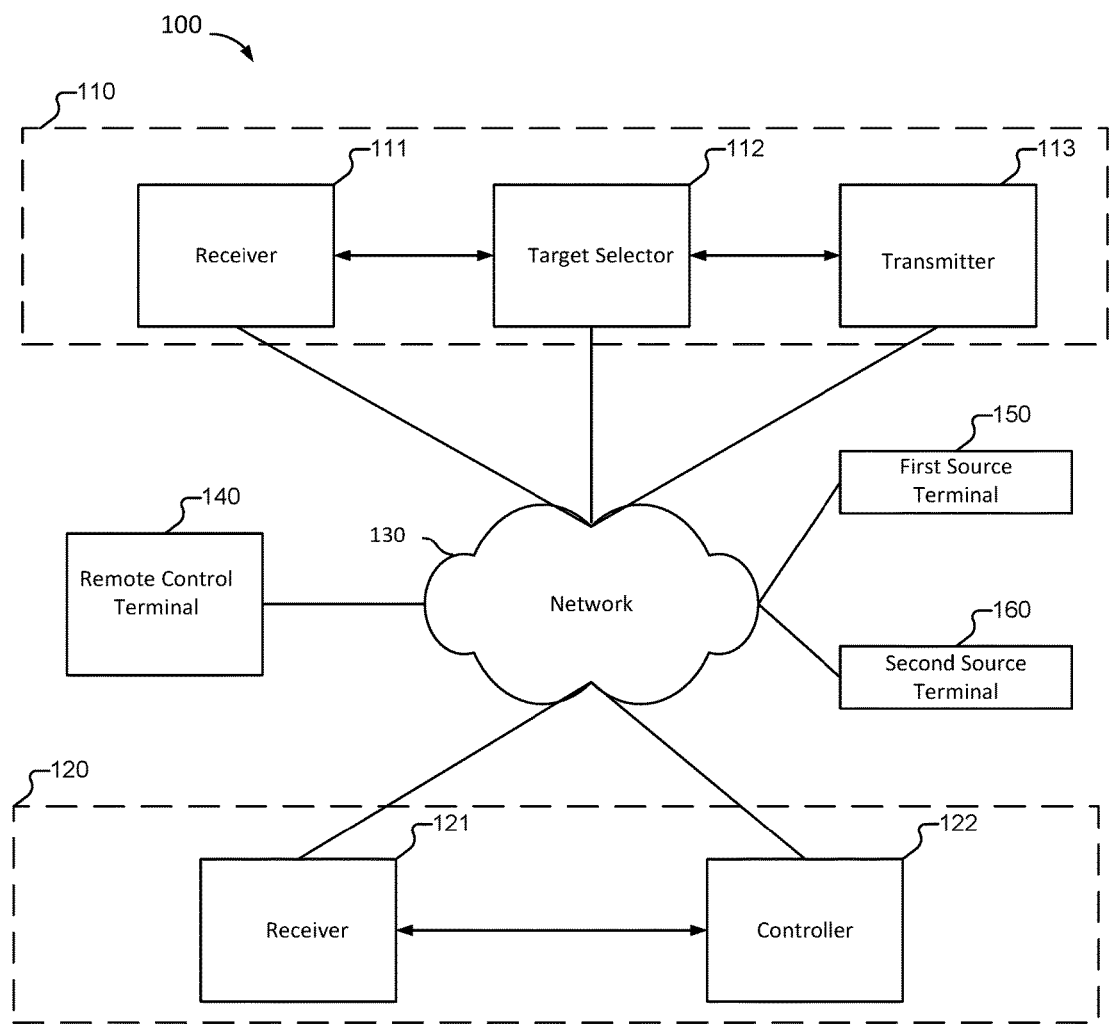
FIG. 1 is a structural diagram of a system for controlling one or more source terminals according to various embodiments of the present application.

The same or similar marks in the drawings represent same or similar components.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In one typical configuration of the present application, terminals, service network equipment, and trusted parties all comprise one or more processors (CPUs), input/output interfaces, network interfaces, and memory. Memory may include such forms as volatile storage devices in computer-readable media, random access memory (RAM), and/or non-volatile memory, such as read-only memory (ROM) or flash memory (flash RAM). Memory is an example of a non-transitory computer-readable medium. Non-transitory computer-readable media including permanent, volatile, removable, and non-removable media can be used to store information using any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disk (DVD) or other optical storage, magnetic cassettes, magnetic tape or magnetic disc storage, other magnetic storage equipment, or any other non-transmission media that can be used to store information that is accessible to computers. As defined in this document, computer-readable media does not include temporary computer-readable media, (transitory media), such as modulated data signals and carrier waves.

FIG. 1 is a structural diagram of a system for controlling one or more source terminals according to various embodiments of the present application.

Referring to FIG. 1, a system 100 for controlling one or more source terminals connected to video display equipment is provided. System 100 can implement process 300 of FIG. 3 or process 400 of FIG. 4.

System 100 includes video control equipment 110 and video equipment 120. In some embodiments, the video equipment 120 corresponds to, or otherwise comprises, a video display such as a television, a video monitor, or the like. System 100 can further include a first source terminal 150 or a second source terminal 160. In some embodiments, the video control equipment 110 is integrated with, connected to, or otherwise corresponds to, a terminal such as a video display terminal. The video control equipment 110 can include a receiver 111, a target selector 112, and a transmitter 113. The video equipment 120 can include a receiver 121 and a controller 122. System 100 can further include a network 130 over which the video control equipment 110 and the video equipment 120 communicate. The video equipment 120 can have one or more source terminals connected thereto. The network 130 can be a wired network (e.g., an Ethernet network) or a wireless network (e.g., a WiFi network). In some embodiments, the video control equipment 110 and the video equipment 120 can directly connect with each other via a direct connection such as infrared, Bluetooth, WiFi, HDMI, or the like such that the video control equipment 110 and the video equipment 120 communicate without a network terminal therebetween. In some embodiments, system 100 includes remote control terminal 140. The remote control terminal 140 can communicate with the video control equipment 110 directly or via the network 130. Other media players can be included in system 100 and controlled with control instruction information (e.g., submitted by the remote control terminal 140).

Figure 5:
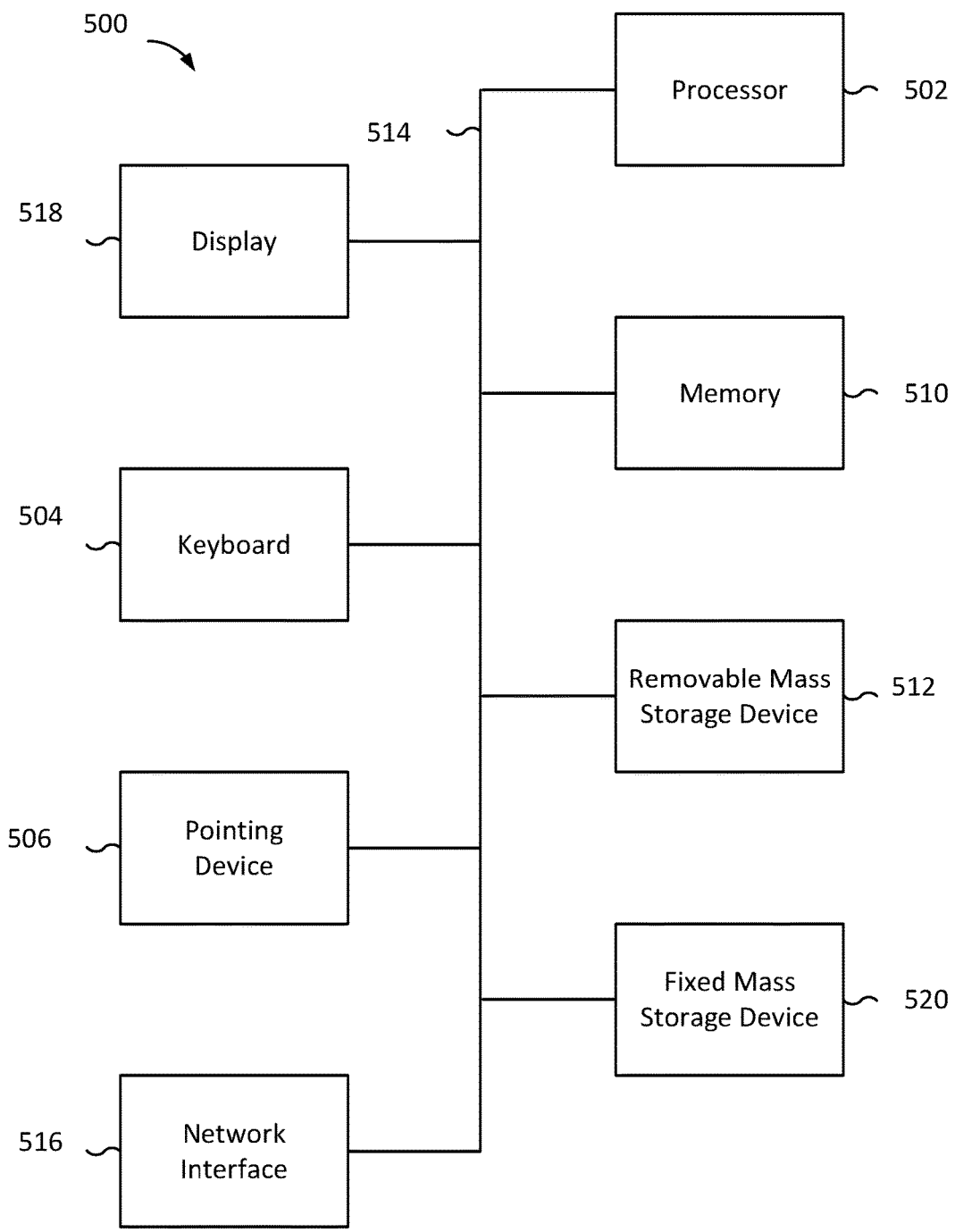
FIG. 5 is a functional diagram of a computer system for controlling one or more source terminals according to various embodiments of the present application.

According to various implementations, video control equipment 110, video equipment 120, remote control terminal 140, first source terminal 150, or second source terminal 160 can be implemented by computer system 500 of FIG. 5.

The video control equipment or the video equipment can be implemented using any of the terminals described above. In some embodiments, the video control equipment 110 is integrated with, connected to, or otherwise corresponds to a terminal.

Receiver 111 of the video control equipment 110 acquires remote control code information submitted by a remote control terminal 140. For example, the remote control terminal 140 sends the remote control code information to the video control equipment 110. Receiver 111 can be implemented using a communication interface including, for example, an external connection, such as a port, cable, wireline, or wireless network interface card, etc., and/or an internal connection such as a communication bus. The remote control terminal 140 can send the remote control code in response to a user input to the remote control terminal 140. The remote control code information can include instruction information indicating an instruction to be performed on a source terminal, an identifier indicating the identity or type of the remote control terminal 140, a target identifier indicating a source terminal to be controlled, the like, or any combination thereof. Target selector 112 determines which of the one or more source terminals (e.g., which of the one or more source terminals connected to the video equipment 120 in system 100) is the target source terminal corresponding to the remote control code information. Transmitter 113 sends control instruction information corresponding to the remote control code information to the target source terminal via a WiFi. Correspondingly, receiver 121 of the video equipment 120 receives from the corresponding video control equipment 110 the control instruction information corresponding to the remote control code information submitted by the remote control terminal 140. Receiver 121 sends the control instruction information to controller 122. In response to controller 122 receiving the control instruction information, controller 122 executes the control instruction information.

According to various embodiments, video control equipment 110 corresponds to an electronic terminal capable of controlling one or more source terminals connected to the video equipment 120. In various embodiments, the video control equipment 110 is itself an independent piece of equipment that is physically separate from the video equipment (for example, the video control equipment is a separate box), or the video control equipment 110 is integrated with the video equipment 120 (for example, the video control equipment and the video equipment are integrated within a television set). The video control equipment 110 can be a terminal such as a PC, an audio/visual receiver, a set-top box, the like, or any combination thereof.

According to various embodiments, a source terminal corresponds to an electronic terminal capable of providing an audio or a video source or converting audio or video signals for a presentation terminal such as, for example, video equipment 120. For example, a source terminal can correspond to a terminal such as a set-top box, a television box, a television tuner, a radio, an MP3 player, a DVD player, the like, or any combination thereof.

According to various embodiments, video equipment 120 corresponds to an electronic terminal that can display played video. The video equipment 120 can interact with users via various user interfaces such as a keyboard, a mouse, a touchpad, a touchscreen, a handwriting device, a remote control, audio control equipment, voice input, the like, or any combination thereof. For example, video equipment can correspond to a terminal such as a PC, a mobile phone, a PDA, a palmtop computers (PPC), a tablet computer, a television set, a smart television, a portable DVD player, user equipment that executes video-playing software, the like, or any combination thereof.

According to various embodiments, remote control terminal 140 can be a terminal such as a TV remote, a PC, a mobile phone, a PDA, a palmtop computers (PPC), a tablet computer, the like, or any combination thereof.

According to various embodiments, the video control equipment 110, the video equipment 120, and the source terminals belong to the same network and are interconnected via a wired or a wireless network. Moreover, the video control equipment 110, the video equipment 120, and the source terminals can share a remote controlling device such as a remote control terminal 140. In some embodiments, the source terminals establish a media connection such as a video connection with the video equipment 120 through a high definition multimedia interface (HDMI) or another similar interface.

The video control equipment 110, the video equipment 120, or source terminals can include an electronic device that can automatically perform digital computations and information processing according to previously set or stored instructions. The hardware thereof includes, but is not limited to, microprocessors, application-specific integrated circuits (ASIC), programmable gate arrays (FPGA), digital processors (DSP), and built-in devices. The components described above can be implemented as software components executing on one or more processors, as hardware components such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the components can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The components may be implemented on a single device or distributed across multiple devices. The functions of the components may be merged into one another or further split into multiple sub-components.

In addition, a part of various embodiments can be applied as a computer program product. For example, when computer program instructions are executed by a computer, the computer instructions can, through the operations of the computer, be invoked or provided according to the methods and/or technical schemes of the various embodiments. The program instructions for invoking the methods of the various embodiments can be stored in fixed or portable recording media and/or transmitted via data streams in broadcasts or other signal-bearing media and/or stored in the working storage of computer equipment operating according to the program instructions. Various embodiments comprise one device. The device comprises storage for storing computer program instructions and a processor for executing computer program instructions. When the computer program instructions are executed by the processor, the device is triggered to run the methods and/or technical schemes of various embodiments as described above.

In some embodiments, receiver 111 of the video control equipment 110 uses a source terminal paired with a remote control terminal via a direct connection (e.g., infrared, Bluetooth, etc.) and/or an application program interface (API) provided by the manufacturer of video equipment 120 to acquire remote control code information submitted by a user through the remote control terminal 140; in some embodiments, the receiver 111 uses a wireless network such as WiFi to receive remote control code information sent from a remote control terminal-paired source terminal or from a video display terminal and thereby acquires the remote control code information submitted by the user via the remote control terminal 140. As used herein, pairing refers to the direct communication and coupling between the remote control terminal and certain equipment, such that the remote control terminal 140 submits remote control code information only to the equipment with which the remote control terminal 140 is paired. For example, the remote control code information that is sent from the remote control terminal 140 can only be received by the equipment (or other terminals) with which the remote control terminal 140 is paired. As will be shown below, the remote control terminal can be used to control other terminals that are not paired with the remote control terminal.

In some embodiments, the remote control terminal 140 corresponds to a terminal that remotely controls another terminal. For example, the remote control terminal 140 can provide instructions to other terminals to cause the other terminals to perform a command or the like. For example, a remote control terminal can correspond to a terminal such as remote controls and/or mobile equipment (e.g., mobile phones, smart phones, and tablets) which become remote controls by virtue of having remote control software installed thereon.

In some embodiments, the remote control code information corresponds to code information that includes encoded keystroke information executed by a user using the remote control terminal 140 (e.g., unified code information mapped from keystroke information executed by a user using the remote control terminal 140), and/or raw keystroke information executed by a user using the remote control terminal 140. In some embodiments, the unified code information mapped from keystroke information can include unified code uniformly mapped for Android operating systems, which makes it possible for equipment not paired with the remote control terminal to execute corresponding remote control code information. For example, in the case of a remote control terminal implemented using an Android operating system, assuming that the remote control information of the remote control terminal 140 corresponding to the "Channel down one" key for a set-top box A (which is paired with remote control terminal 140) is "0x01" and that the remote control information corresponding to the "Channel down one" key for a set-top box B of another manufacturer is "0x10," then, so long as the remote control code information of the "Channel down one" key of the other manufacturer is mapped into Android system unified code (e.g., if "0x01" and "0x10" both correspond to the same Android system unified code 0x1111 which, as an example, represents the "Channel down one" command), the remote control terminal can be used to control both boxes A and B. In the event that a user executes the "Channel down one" key with the remote control terminal 140 which is designed to control the set-top box A, the encoded key can also be forwarded to set-top box B if the video signal currently used by the video display terminal comes from the set-top box B, which will be able to execute the "Channel down one" operation. The keys provided by the remote control terminal 140 include confirmation keys, channel keys, channel adjustment keys, sound adjustment keys, menu keys, play speed adjustment keys, or the like. Other control keys or key commands are possible. In some embodiments, the remote control terminal 140 can use another operating system and the technique described herein is still applicable so long as a remote control code mapping similar to the Android system's unified code is implemented.

As an example of an implementation of the various embodiments, assume that User A's home television network (e.g., system 100) is composed of two source terminals (e.g., a set-top box (STB1) corresponding to first source terminal 150, and a set-top box (STB2) corresponding to second source terminal 160), a video display terminal (e.g., a smart television set (Smart TV1)), and a remote control terminal (e.g., a remote control (TV Remote Controller 1)). The remote control terminal 140 (e.g., TV Remote Controller 1) can be paired with any one of the two source terminals (e.g., STB1 and STB2) and the video display terminal (e.g., Smart TV1). In some embodiments, the TV Remote Controller 1 only submits remote control code information to the equipment or terminal with which the TV Remote Controller 1 is paired. For example, in order for a terminal or piece of equipment to receive the remote control code information from the TV Remote Controller 1, the terminal or piece of equipment needs to be paired with the TV Remote Controller 1. In other words, the remote control code information sent by TV Remote Controller 1 can only be received by the equipment or terminal that is paired with the TV Remote Controller 1. Assuming that TV Remote Controller 1 is paired with Smart TV1 and that the video control equipment 110 is integrated with Smart TV1 (e.g., the video display terminal), in the event that User A uses TV Remote Controller 1 to change the channel, User A presses the "Channel up one" key on the TV Remote Controller 1 to increment the channel number being displayed by one. Further assuming that the code corresponding to the "Channel up one" key is mapped to "0x00" and that Smart TV1 paired with TV Remote Controller 1 can receive the remote control code information "0x00" submitted by TV Remote Controller 1, then receiver 111 of the video control equipment 110 can obtain the remote control code information "0x00" submitted by TV Remote Controller 1. Receiver 111 can obtain the remote control code information sent from the TV Remote Controller 1 by using an application program interface (API) provided by Smart TV1 to decode the received remote control code information or by receiving the remote control code information "0x00" forwarded by Smart TV1.

In some embodiments, receiver 111 can receive remote control terminal-submitted remote control code information from at least one of the one or more source terminals. For example, to continue using the example above, assuming that TV Remote Controller 1 is paired with STB1 and that the video control equipment 110 is integrated with Smart TV1, in the event that User A uses TV Remote Controller 1 to change the channel, User A presses the "Channel up one" key on the TV Remote Controller 1. Further assuming that the code corresponding to the "Channel up one" key corresponds to "0x00," STB1, which is paired with TV Remote Controller 1, can receive the remote control code information "0x00" submitted by TV Remote Controller 1. In this example, receiver 111 of the video control equipment 110 can obtain the remote control code information "0x00" submitted by TV Remote Controller 1 by using an API provided by STB1 itself or by receiving the remote control code information "0x00" forwarded by STB1.

Target selector 112 determines which of the one or more source terminals is the target source terminal corresponding to the remote control code information. In some embodiments, target selector 112 uses the video signal currently used by the video display terminal as a basis for determining which of the one or more source terminals is the target source terminal corresponding to the remote control code information. For example, target selector 112 regards the source terminal corresponding to the video signal currently used by the video display terminal as the target source terminal. The video signal currently used by the video display terminal can correspond to the video signal currently played by the video display terminal. In some embodiments, the video signal currently used by the video display terminal indicates the source terminal from which the video signal is received (e.g., the video signal can include an identifier of the corresponding source terminal). For example, target selector 112 can receive the video signal and determine the source terminal from which the video signal is received. In some embodiments, the video equipment provides target selector 112 with an indication of the source terminal from which the video signal currently being used by the video display terminal is received.

Continuing with the above example, assuming that the video signal currently used by the video display terminal (e.g., Smart TV1) is received from HDMI2, which corresponds to a source terminal (e.g., HDMI2 is connected to the set-top box STB2), target selector 112 (of the video control equipment 110) can determine that the target source terminal corresponding to the remote control code information "0x00" submitted by TV Remote Controller 1 is STB2. As another example, assuming that the video signal currently used by the video display terminal (e.g., Smart TV1) comes from interface HDMI1, which corresponds to a source terminal (e.g., the set-top box STB1), target selector 112 can determine that the target source terminal corresponding to the remote control code information "0x00" submitted by TV Remote Controller 1 is STB1.

In some embodiments, transmitter 113 generates control instruction information corresponding to the remote control code information. The control instruction information can include an instruction for controlling the source terminal, such as Channel up, Channel down, fast forward, rewind, pause, increase sound volume, decrease sound volume, etc. Transmitter 113 sends the control instruction information via, for example, a wireless network 130 such as WiFi to the target source terminal. Continuing with the above example, transmitter 113 generates a control instruction such as "Control Instruction 0x00," corresponding to the remote control code information "0x00," and sends the control instruction information via, for example, a wireless network such as WiFi to the target source terminal (e.g., STB1).

Receiver 121 of the video equipment (e.g., the video equipment 120) receives, via for example a wireless network such as WiFi, the control instruction information corresponding to the remote control code information submitted by the remote control terminal that is sent by the corresponding video control equipment 110 (e.g., that is communicated over the network 130 by transmitter 113 of the video control equipment 110). The video equipment that receives the control instruction information from the network can correspond to, or otherwise comprise, the video equipment 120 or the source terminal.

In response to receiving the control instruction information, controller 122 executes the control instruction information. For example, controller 122 executes the operation corresponding to the control instruction information. For example, assuming that the video equipment 120 corresponds to the target video equipment, such as the set-top box STB1, receiver 121 receives the control instruction information (e.g., Control Instruction 0x00) that corresponds to the remote control information "0x00" and that is sent by the video control equipment 110. Thereupon, controller 122 can execute the control instruction information (e.g., Control Instruction 0x00). For example, controller 122 executes the "Channel up one" operation.

In some embodiments, various modules of the video control equipment 110 and the video equipment 120 are continually operating with respect to each other. Specifically, receiver 111 of the video control equipment 110 continually acquires remote control code information submitted by a remote control terminal 140. Target selector 112 continually determines which of the one or more source terminals is the target source terminal corresponding to the remote control code information. For example, target selector 112 can determine the target source terminal in response to receiving the remote control code information. Transmitter 113 continually sends control instruction information corresponding to the remote control code information to the target source terminal. Correspondingly, receiver 121 of the video equipment 120 continually receives from the corresponding video control equipment 110 the control instruction information corresponding to the remote control code information submitted by the remote control terminal 140. Controller 122 continually executes the control instruction information. Persons skilled in the art should be able to understand that "continually" refers here to the continual performance by the various modules of the video control equipment 110 and the video equipment 120 of the following with respect to each other: acquiring remote control code information, determining the target source terminal, and sending, receiving, and executing control instruction information. The above are performed until the video control equipment 110 has stopped acquiring remote control code information for a long period of time.

In some embodiments, target selector 112 of the video control equipment 110 detects whether the remote control code information corresponds to a source terminal. For example, target selector 112 uses the control instruction information corresponding to the control code information and the control instruction information supported by the source terminal as a basis for determining whether the control code information corresponds to the source terminal. If the control instruction information matches the control instruction information supported by the source terminal, then target selector 112 determines that the remote control code information corresponds to the source terminal. If the control instruction information does not match the control instruction information supported by the source terminal, target selector 112 determines that the remote control code information does not correspond to the source terminal. In some embodiments, if commands in the remote control code information is supported by more than one source terminal, a user can be prompted (e.g., at the remote control terminal) to select the target source terminal. For example, the user (e.g., the remote control terminal or video display equipment) can be presented with a list of the source terminals that support the remote control code information, and the user can submit selection of the target source terminal. In some embodiments, if commands in the remote control code information is supported by more than one source terminal, the target source terminal can be determined from other information included in the remote control code information (e.g., an identifier associated with the target source terminal, an identifier associated with a type of source terminal, or the like). If the remote control code information corresponds to the source terminal, then target selector 112 determines which of the one or more source terminals (e.g., first source terminal 150 or second source terminal 160) corresponds to the target source terminal corresponding to the remote control code information. In some embodiments, the remote control code information can include an identifier of a source terminal (or a type of source terminal) such that target selector 112 can determine whether the control code information corresponds to the source terminal. In some embodiments, the remote control code information includes an identifier of a type of source terminal to which the control code information corresponds. For example, in the event that User A uses TV Remote Controller 1 (e.g., corresponding to remote control terminal 140) to change the channel, User A presses the "Channel up one" key. Assuming that the code corresponding to the "Channel up one" key is "0x00," the video display terminal (e.g., Smart TV1), which is paired with TV Remote Controller 1, receives the remote control code information "0x00" submitted by TV Remote Controller 1, and receiver 111 of the video control equipment 110 obtains the remote control code information "0x00" submitted by TV Remote Controller 1 by using the application program interface (API) provided by STB1 itself or by receiving the remote control code information "0x00" forwarded by STB1. Target selector 112 detects whether the remote control code information "0x00" corresponds to the source terminal. Assuming that the control instruction information (e.g., "Control Instruction 0x00") corresponding to the remote control code information "0x00" matches the control instruction information supported by the source terminal, target selector 112 determines that the remote control code information "0x00" corresponds to the source terminal. Then, target selector 112 determines which of the one or more source terminals corresponds to the target source terminal corresponding to the remote control code information. In some embodiments, the video control equipment 110 can store a mapping of control instruction information to source terminals. The mapping of control instruction information to source terminals can be used to identify source terminals that support a specific command associated with the control instruction information corresponding to remote control code information. Target selector 112 can use the mapping of control instruction information to source terminals as a basis for determining which of the one or more source terminals corresponds to the target source terminal corresponding to the remote control code information, or for determining whether a source terminal supports the remote control code information. In some embodiments, the target selector can use source information code (e.g., that identifies a source terminal or a type of source terminal) included in the remote control code information to determine the target source terminal.

In some embodiments, the video control equipment is included in, integrated with, connected to, or otherwise corresponds to the video display terminal. Accordingly, the video control equipment 110 can further comprise a display detector (not shown). The display detector is configured to detect whether the remote control code information corresponds to the video display terminal. For example, if the control instruction information corresponding to the remote control code information matches the control instruction information supported by the video display terminal, then the display detector determines that the remote control code information corresponds to the video display terminal. If the remote control code information corresponds to the video display terminal, then the control instruction information corresponding to the remote control code information is executed on the video display terminal.

For example, in the event that User A uses TV Remote Controller 1 (e.g., corresponding to remote control terminal 140 of FIG. 1) to change the channel, User A presses the "Channel up one" key on TV Remote Controller 1. Assuming that the code corresponding to the "Channel up one" key is "0x00," Smart TV1, which is paired with TV Remote Controller 1, receives the remote control code information "0x00" submitted by TV Remote Controller 1, and receiver 111 of the video control equipment 110 obtains the remote control code information "0x00" submitted by TV Remote Controller 1 by using an API provided by STB1 itself or by receiving the remote control code information "0x00" forwarded by STB1. In the event that the remote control code information is received, the display detector can detect whether the remote control code information "0x00" corresponds to the video display terminal (e.g., Smart TV1). Assuming that the control instruction information (e.g., "Control Instruction 0x00") corresponding to the remote control code information "0x00" matches the control instruction information supported by the video display terminal (e.g., Smart TV1), the display detector executes the control instruction information corresponding to the remote control code information. For example, the display detector executes the "Channel one up" operation on Smart TV1.

Figure 2:
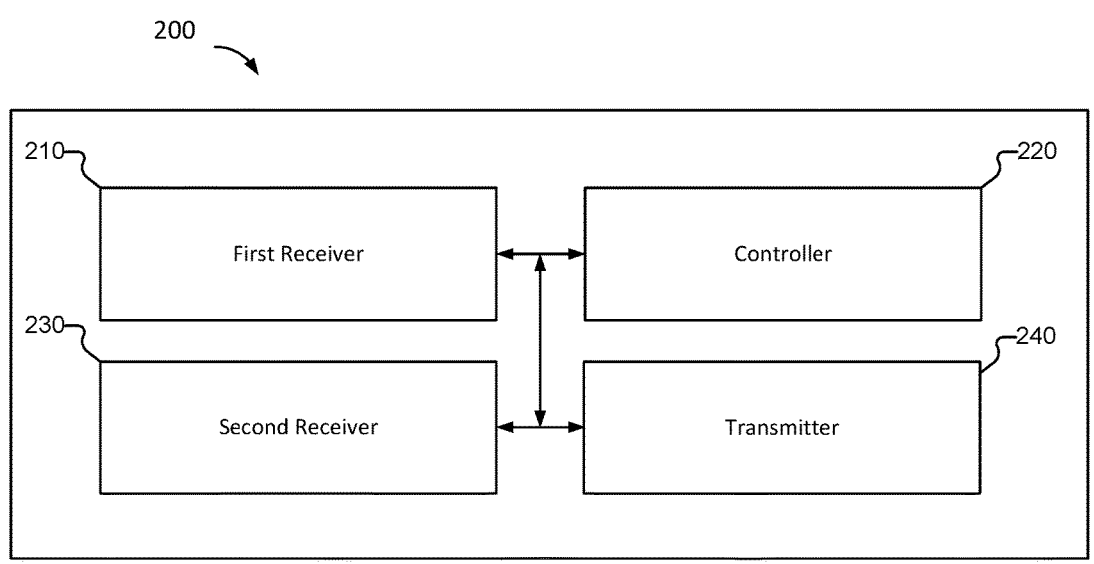
FIG. 2 is a structural diagram of video equipment for controlling one or more source terminals according to various embodiments of the present application.

FIG. 2 is a structural diagram of video equipment for controlling one or more source terminals according to various embodiments of the present application.

Referring to FIG. 2, video equipment 200 configured to control a source terminal connected to a video display terminal is provided. Video equipment 200 can implement process 300 of FIG. 3 or process 400 of FIG. 4. Video equipment 200 can correspond to video equipment 120 of system 100. In some embodiments, video equipment 200 can be implemented by computer system 500 of FIG. 5.

Video equipment 200 comprises a first receiver 210, a controller 220, a second receiver 230, and a transmitter 240.

First receiver 210 is configured to receive the control instruction information that corresponds to the remote control code information submitted by the remote control terminal and that was sent by the corresponding video control equipment.

Controller 220 is configured to execute the control instruction information. For example, controller 220 executes the control instruction information in response to the second module receiving the control instruction information corresponding to the remote control code information.

Second receiver 230 is configured to acquire second remote control code information from the remote control terminal.

Transmitter 240 is configured to send the second remote control code information to the video control equipment (e.g., video control equipment 110 of system 100). The second remote control code information can be the same as or different from the remote control code information in first receiver 210.

In some embodiments, first receiver 210 of video equipment 200 corresponds to receiver 121 of video equipment 120 illustrated in FIG. 1, and controller 220 of video equipment 200 corresponds to controller 122 of video equipment 120 illustrated in FIG. 1.

In some embodiments, second receiver 230 is configured to receive the second remote control code information from the video display terminal or from a source terminal that is paired with a remote control terminal. The second remote control code information can be routed to second receiver 230 via a network over which the video display terminal, the source terminal, or the remote control terminal communicate. For example, second receiver 230 is configured to use a source terminal paired with the remote control terminal or an API provided by the video display terminal to acquire second remote control code information submitted by the user through the remote control terminal, or second receiver 230 uses a wireless network such as WiFi to receive remote control terminal-submitted remote control code information sent from a remote control-paired source terminal or from the video display terminal and thereby acquires second remote control code information from the remote control terminal. In some embodiments, if the video equipment 200 is paired with a remote control terminal, second receiver 230 can directly receive second remote control code information sent from the remote control terminal. The second remote control code information can be the same as or different from the remote control code information in first receiver 210.

For example, User A's home television network is comprised of two source terminals (e.g., a set-top box (STB1), and a set-top box (STB2)), one piece of video display terminal (e.g., a smart television set (Smart TV1)), and one remote control terminal (e.g., a remote control (TV Remote Controller 1)). The remote control terminal (e.g., TV Remote Controller 1) can be paired with any one of the following: the two source terminals (e.g., STB1 and STB2) or the television display equipment (e.g., Smart TV1). For example, in some embodiments, TV Remote Controller 1 can only submit remote control code information to the equipment (e.g., terminal) with which TV Remote Controller 1 is paired. In other words, the remote control code information sent by TV Remote Controller 1 can only be received by the equipment with which TV Remote Controller is paired. Assuming that TV Remote Controller 1 is paired with Smart TV1 and that the video control equipment (e.g., video control equipment 110) is integrated with Smart TV1, in the event that User A uses TV Remote Controller 1 to change the channel, User A presses the "Channel down one" key on TV Remote Controller 1 (or otherwise submits a corresponding input via an interface on the TV Remote Controller). If the code corresponding to the "Channel down one" key is "0x01" and Smart TV1 paired with TV Remote Controller 1 can receive the second remote control code information "0x01" submitted by TV Remote Controller 1, and if the video equipment (e.g., video equipment 200) is STB2, then second receiver 230 of the video equipment 200 can obtain the second remote control code information "0x01" submitted by TV Remote Controller 1. Second receiver 230 can obtain the second remote control code information "0x01" submitted by TV Remote Controller 1 through the API provided by Smart TV1 itself or by receiving the second remote control code information "0x01" forwarded by Smart TV1.

Second receiver 230 and first receiver 210 can be implemented serially or in parallel. In some embodiments, first receiver 210 and second receiver 230 can be implemented by the same module, or the like. For example, first receiver 210 and second receiver 230 can be integrated.

Transmitter 240 sends the second remote control code information to the video control equipment. For example, transmitter 240 sends the second remote control code information to the video control equipment via a wireless network such as WiFi.

In some embodiments, transmitter 240 sends unified remote control code information mapped from the second remote control code information to the video control equipment. For example, to continue the example above, transmitter 240 may obtain unified remote control code information by mapping the remote control code information "0x01" submitted by the TV Remote Controller 1. The video equipment 200 can store mappings of remote control code information (e.g., corresponding to a remote control terminal) to unified remote control code information. The mappings of remote control code information to unified remote control code information can indicate that "0x01" of remote control code submitted by a first remote control terminal (e.g., TV Remote Controller 1) using a first control code format (or syntax) corresponds to "U0x11" of unified code control code information. Further, the mappings of remote control code information to unified remote control code information can indicate that "0x00" of remote control code submitted by a second remote control terminal using a second control code format (or syntax) corresponds to "U0x11" of unified code control code information. The video equipment 200 can store mappings of functions to unified remote control code information and mappings of functions to remote control code information corresponding to a particular remote control terminal or to a particular format (or syntax) of remote control code information. For example, a channel down function can be mapped to "0x01" in a first control code format (or syntax) such as the format used by TV Remote Controller 1, mapped to "0x00" in a second control code format, and mapped to "Ux011" in a unified remote control code format. Transmitter 240 can query the mappings of remote control code information to unified remote control code information to obtain the unified remote control code information corresponding to the second remote control code information. For example, transmitter 240 maps the remote control code information to unified remote control code information, such as Android unified code. In the event that transmitter 240 obtains the unified remote control code information corresponding to the second remote control code information, transmitter 240 sends the unified remote control code information to video control equipment (e.g., video control equipment 110).

In some embodiments, video equipment further comprises a tenth module (not shown). The tenth module is configured to detect whether the second remote control code information corresponds to the video equipment 200. In the event that the second remote control code information corresponds to other video equipment, transmitter 240 sends the second remote control code information to the video control equipment.

In some embodiments, the tenth module can determine whether the second remote control code information corresponds to video equipment 200 (e.g., the video display terminal) based at least in part on the video signal currently being used by the video display terminal. For example, the tenth module can receive the video signal currently being used or displayed by the video display terminal and determine the source terminal from which the video signal is received. In some embodiments, the video equipment provides the tenth module with an indication of the source terminal from which the video signal currently is being used by the video display terminal. In some embodiments, the video signal currently used by the video display terminal indicates the source terminal from which the video signal is received. For example, the tenth module can receive the video signal and determine the source terminal from which the video signal is received. In some embodiments, video equipment 200 provides the tenth module with an indication of the source terminal from which the video signal currently is being used by the video display terminal. The tenth module can use the indication or determination of the source terminal as a basis for determining whether the second remote control code information corresponds to video equipment 200.

In some embodiments, the tenth module can determine whether the second remote control code information corresponds to video equipment 200 (e.g., the video display terminal) based at least in part on whether video equipment 200 or a source terminal comprised in, or otherwise connected to, video equipment 200 supports a command or instruction corresponding to the second remote control code information. For example, in the event that video equipment 200 or a source terminal cannot carry out an action requested in the second remote control code information, the tenth module can determine that the second remote control code information does not correspond to video equipment 200. In the event that the second remote control code information corresponds to other video equipment (e.g., if the second remote control code information does not correspond to video equipment 200), transmitter 240 sends the second remote control code information to the video control equipment. For example, assuming that the tenth module determines that the second remote control code information "0x01" does not correspond to the video equipment 200 (e.g., the second remote control code information "0x01" corresponds to other video equipment), transmitter 240 sends the second remote control code information to video control equipment (e.g., video control equipment 110). Transmitter 240 can send the second remote control code information to the video control equipment through, for example, a wireless network such as WiFi.

Figure 3:
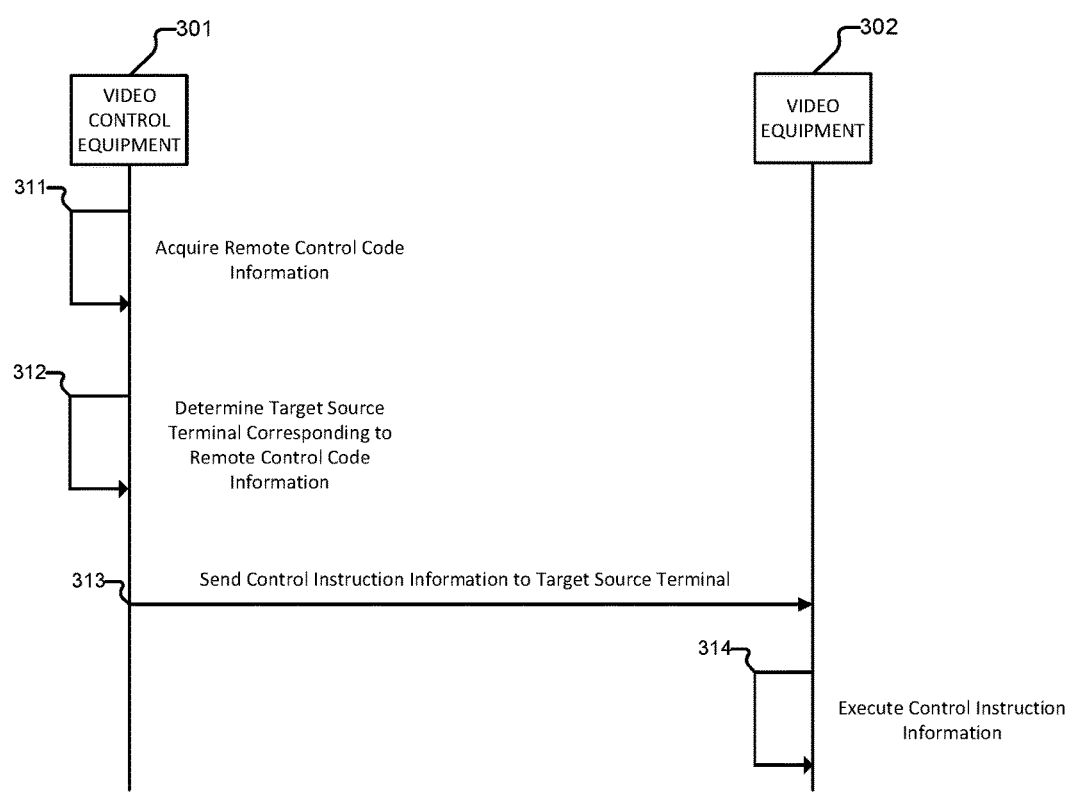
FIG. 3 is a flowchart of a method of video control equipment and video equipment controlling one or more source terminals according to various embodiments of the present application.

FIG. 3 is a flowchart of a method of video control equipment and video equipment controlling one or more source terminals according to various embodiments of the present application.

Referring to FIG. 3, process 300 for controlling one or more source terminals connected to a video display terminal is provided. Process 300 can be implemented by system 100.

At 311, remote control code information is acquired. Video control equipment 301 can receive the remote control code information from a remote control terminal. The video control equipment 301 can receive the remote control code information directly from the remote control terminal (that submitted the remote control code information) or over a network to which the video control equipment 301 is connected. In some embodiments, the video control equipment 301 receives the remote control code information from video equipment that determines that the remote control code information does not apply (does not correspond) to the video equipment.

At 312, a target source terminal corresponding to the remote control code information is determined. Video control equipment 301 can determine which of one or more source terminals corresponds to the target source terminal corresponding to the remote control code information.

In some embodiments, the video control equipment 301 can determine the target source terminal according to a capability of the one or more source terminals. For example, the video control equipment 301 can query a mapping of control instruction information to capabilities of the one or more source terminals for the one or more source terminals having a capability corresponding to the control instruction information corresponding to the remote control code information. The video control equipment 301 can determine the target source terminal according to whether a source terminal supports the remote control code information or the control instruction information corresponding to the remote control code information.

In some embodiments, the video control equipment 301 determines the target source terminal based at least in part on the video signal currently being used (e.g., which video channel is currently active and playing video) by the video display terminal. For example, the video control equipment 301 can determine the target source terminal to be the source terminal from which the currently displayed video signal is received by the video display terminal.

At 313, the control instruction information is sent to the target source terminal. In response to determining the target source terminal, the video control equipment 301 sends control instruction information corresponding to the remote control code information to the target source terminal. The target source terminal can be included in, connected to, or otherwise associated with video equipment 302. Correspondingly, the video equipment 302 receives from the corresponding video control equipment the control instruction information corresponding to the remote control code information submitted by the remote control terminal.

At 314, the control instruction information is executed. The video equipment 302 can execute the control instruction information in response to receiving the control instruction information. In some embodiments, the video equipment 302 can communicate the control instruction information or command information corresponding to the control instruction information to the target source terminal. For example, the video equipment 302 can parse the control instruction information and carry out a command associated with the control instruction information (e.g., a command associated with an input to the remote control terminal). In the event that the video equipment 302 comprises the target source terminal, or otherwise corresponds to the target source terminal, the video equipment 302 executes the control instruction information. In the event that the video equipment 302 is connected to the source terminal, the video equipment can forward the control instruction information to the target source terminal in a format that is readable by the target source terminal (e.g., "control code=0x01"). For example, the video equipment 302 can convert the control instruction information to a format that is readable by the target source terminal, if necessary.

The video control equipment 301 can be independent of the video display terminal, or the video control equipment 301 can be integrated with the video display terminal. In some embodiments, the video control equipment 301, the video display terminal, and the source terminal belong to the same network and are interconnected via a wired or a wireless network. The video control equipment 301, the video display terminal, and the source terminal can share a remote control terminal such as a remote control that can receive inputs from a user and that can communicate commands to one or more of the video control equipment 301, the video display terminal, or the source terminal in order to control one or more of the video control equipment 301, the video display terminal, or the source terminal. The source terminal can also establish a video connection with the video display terminal via an interface such as through a high definition multimedia interface (HDMI).

In some embodiments, at 311, the video control equipment 301 uses a source terminal paired with the remote control terminal or an API provided by the video display terminal to acquire the remote control code information submitted by the user through the remote control terminal. In some embodiments, the video control equipment 301 uses a wireless network such as WiFi to receive remote control terminal-submitted remote control code information sent from a remote control terminal-paired source terminal or video display terminal and thereby acquires the remote control code information submitted by the user via the remote control terminal. In some embodiments, a remote control terminal submits remote control code information to the equipment with which the remote control terminal is paired. For example, the remote control code information that is sent from the remote control terminal can only be received by the equipment (or other terminals) with which the remote control terminal is paired.

In some embodiments, the remote control code information corresponds to code information that is obtained by encoding keystroke information executed by a user on the remote control terminal or to raw keystroke information executed by a user on the remote control terminal or to unified code information mapped from keystroke information executed by a user on the remote control terminal. The unified code information mapped from keystroke information can include unified code uniformly mapped for Android operating systems, which thus makes it possible for equipment not paired with the remote control terminal to execute corresponding remote control code information. For example, in the case of an Android operating system device, assuming that the remote control information of the remote control terminal corresponding to the "Channel down one" key for a set-top box A is "0x01" and that the remote control information of the remote control terminal corresponding to the "Channel down one" key for a set-top box B of another manufacturer is "0x10," then, so long as the remote control code information of the "Channel down one" key of the other manufacturer is mapped into Android system unified code (e.g., if "0x01" and "0x10" correspond to the same Android system unified code), in the event that a user executes the "Channel down one" key with the remote control terminal paired with the set-top box A, the set-top box B will be able to execute the "Channel down one" operation if the video signal currently used by the video display terminal comes from the set-top box B. The keys provided by the remote control terminal include confirmation keys, channel keys, channel adjustment keys, sound adjustment keys, and menu keys, or the like. Other control keys or key commands are possible. In some embodiments, the remote control terminal can use various other operating systems.

As an example of an implementation of the various embodiments, assume that User A's home television network is composed of two source terminals (e.g., a set-top box (STB1), and a set-top box (STB2)), a video display terminal (e.g., a smart television set (Smart TV1)), and a remote control terminal (e.g., a remote control (TV Remote Controller 1)). The remote control terminal (e.g., TV Remote Controller 1) can be paired with any one of the two source terminals (e.g., STB1 and STB2) and the television display equipment (e.g., Smart TV1). In some embodiments, the TV Remote Controller 1 only submits remote control code information to the equipment or terminal with which the TV Remote Controller 1 is paired. For example, in order for a terminal or piece of equipment to receive the remote control code information from the TV Remote Controller 1, the terminal or piece of equipment needs to be paired with the TV Remote Controller 1. In other words, the remote control code information sent by TV Remote Controller 1 can only be received by the equipment or terminal that is paired with the TV Remote controller 1. Assuming that TV Remote Controller 1 is paired with Smart TV1 and that the video control equipment 1 is integrated with Smart TV1, in the event that User A uses TV Remote Controller 1 to change the channel, User A presses the "Channel up one" key on the TV Remote Controller 1. Further assuming that the code corresponding to the "Channel up one" key is mapped to "0x00" and that Smart TV1 paired with TV Remote Controller 1 can receive the remote control code information "0x00" submitted by TV Remote Controller 1, then, at 311, the video control equipment 301 can obtain the remote control code information "0x00" submitted by TV Remote Controller 1. The video control equipment 301 can obtain the remote control code information from the TV Remote Controller 1 through the API provided by the Smart TV1 itself or by receiving the remote control code information "0x00" forwarded by Smart TV1.

In some embodiments, a home television network corresponds to a media network comprising various source terminals that provide content (e.g., audio/video content) to be presented by a media player (e.g., video display terminal), and the media player. The media network can further comprise control equipment configured to parse remote control code information and to send corresponding control instruction information to a source terminal that a user intends to control with the remote control code information. The control equipment can parse the remote control code information to extract the code corresponding to a particular function. For example, in the event that the control equipment receives remote control code information from TV Remote Controller 1 and the remote control code information corresponds to a channel up function (e.g., input by the user at the TV Remote Controller 1), the control equipment can parse remote control code information received from the TV Remote Controller 1 to extract a code "0x00" that corresponds to a channel up function.

In some embodiments, at 311, the video control equipment 301 can receive remote control terminal-submitted remote control code information from at least one of the one or more source terminals. For example, to continue using the example above, assuming that TV Remote Controller 1 is paired with STB1 and that the video control equipment 301 is integrated with Smart TV1, in the event that User A uses TV Remote Controller 1 to change the channel, User A presses the "Channel up one" key on the TV Remote Controller 1. Further assuming that the code corresponding to the "Channel up one" key corresponds to "0x00." STB1, which is paired with TV Remote Controller 1, can receive the remote control code information "0x00" submitted by TV Remote Controller 1. In this example, at 311, the video control equipment 301 can obtain the remote control code information "0x00" submitted by TV Remote Controller 1 by using the API provided by STB1 itself or by receiving the remote control code information "0x00" forwarded by STB1.

As discussed above, at 312, the video control equipment 301 determines which of the one or more source terminals corresponds to the target source terminal corresponding to the remote control code information. For example, the video control equipment 301 determines which of the one or more source terminals the remote control code information is intended to control (e.g., which of the one or more source terminals is to receive control instruction information corresponding to the remote control code information). For example, the video control equipment 301 uses the video signal currently used by the video display terminal as a basis for determining which of the one or more source terminals is the target source terminal corresponding to the remote control code information. For example, the video control equipment 301 regards the source terminal corresponding to the video signal currently used by the video display terminal as the target source terminal. The video signal currently used by the video display terminal can correspond to the video signal currently played by the video display terminal. In some embodiments, the video signal currently used by the video display terminal indicates the source terminal from which the video signal is received. For example, the video control equipment 301 can receive the video signal and determine the source terminal from which the video signal is received. In some embodiments, the video display terminal provides the video control equipment 301 with an indication of the source terminal from which the video signal currently being used by the video display terminal is received.

Continuing with the above example, assume that the video signal currently used by the video display terminal (e.g., Smart TV1) is received from HDMI2, which corresponds to a source terminal (e.g., the set-top box STB2). Thus, at 312, the video control equipment 301 can determine that the target source terminal corresponding to the remote control code information "0x00" submitted by TV Remote Controller 1 is STB2. As another example, assuming that the video signal currently used by the video display terminal (e.g., Smart TV1) comes from interface HDMI1, which corresponds to a source terminal (e.g., the set-top box STB1), at 312, the video control equipment 301 can determine that the target source terminal corresponding to the remote control code information "0x00" submitted by TV Remote Controller 1 is STB1.

In some embodiments, at 313, the video control equipment 301 generates control instruction information corresponding to the remote control code information. The control instruction information can include an instruction for controlling the source terminal. For example, the video control equipment 301 can parse the remote control code information and generate corresponding control instruction information that is readable by the target source terminal. The video control equipment 301 sends the control instruction information via, for example, a wireless network such as WiFi to the target source terminal. Continuing with the above example, at 313, the video control equipment 301 generates a control instruction such as "Control Instruction 0x00" corresponding to the remote control code information "0x00," and sends the control instruction information via, for example, a wireless network such as WiFi to the target source terminal (e.g., STB1).

The video equipment 302 receives, via, for example, a wireless network such as WiFi, control instruction information corresponding to the remote control code information submitted by the remote control terminal and sent by the corresponding video control equipment 301. The video equipment 302 comprises the video display terminal or the source target.

In some embodiments, the video equipment 302 executes the control instruction information. For example, the video equipment 302 executes the operation corresponding to the control instruction information. For example, assume that the video equipment 302 corresponds to the target video equipment (e.g., the target source terminal), such as the set-top box STB1. The video equipment 302 receives the control instruction information (e.g., Control Instruction 0x00) that corresponds to the remote control information "0x00" and that is sent by the video control equipment 301 at 313. Thus, at step 314, the video equipment 302 can execute the control instruction information (e.g., Control Instruction 0x00). For example, the video equipment 302 executes the "Channel up one" operation. In the event that the video equipment 302 is not the target source terminal, the video equipment 302 can send the control instruction information to the target source terminal. For example, the video equipment 302 can parse the control instruction information and generate and send a corresponding command to the target source terminal. In some embodiments, the various steps of the video control equipment 301 and the video equipment 302 are continually operating with respect to each other. Specifically, at 311, the video control equipment 301 continually acquires remote control code information submitted by a remote control terminal. At 312, the video control equipment 301 continually determines which of the one or more source terminals is the target source terminal corresponding to the remote control code information. At 313, the video control equipment 301 continually sends to the target source terminals control instruction information corresponding to the remote control code information. Correspondingly, the video equipment 302 continually receives from the corresponding video control equipment 301 the control instruction information corresponding to the remote control code information submitted by the remote control terminal. At 314, the video equipment 302 continually executes the control instruction information. 311 through 314 can be performed until the video control equipment 301 has stopped acquiring remote control code information for a sufficient period of time.

In some embodiments, at 312, the video control equipment 301 detects whether the remote control code information corresponds to a source terminal. For example, the video control equipment 301 can use the control instruction information corresponding to the control code information and the control instruction information supported by the source terminal as a basis for determining whether control code information corresponds to the source terminal. For example, the can query a database such as a database storing a mapping of control instruction information to corresponding source terminals. If the control instruction information matches the control instruction information supported by the source terminal, then the video control equipment 301 determines that the remote control code information corresponds to the source terminal. If the control instruction information does not match the control instruction information supported by the source terminal, the video control equipment 301 determines that the remote control code information does not correspond to the source terminal. If the remote control code information corresponds to the source terminal, the video control equipment 301 determines which of the one or more source terminals is the target source terminal corresponding to the remote control code information.

For example, in the event that User A uses TV Remote Controller 1 to change the channel, User A presses the "Channel up one" key. Assuming that the code corresponding to the "Channel up one" key is "0x00," Smart TV1, which is paired with TV Remote Controller 1, receives the remote control code information "0x00" submitted by TV Remote Controller 1. At 311, the video control equipment 301 obtains the remote control code information "0x00" submitted by TV Remote Controller 1. For example, the video control equipment 301 can obtain the remote control code information by using the API provided by STB1 itself or by receiving the remote control code information "0x00" forwarded by STB1. At 312, the video control equipment 301 can detect whether the remote control code information "0x00" corresponds to the source terminal. Assuming that the control instruction information, (e.g., "Control Instruction 0x00") corresponding to the remote control code information "0x00" matches the control instruction information supported by the source terminal, at 312, the video control equipment 301 determines that the remote control code information "0x00" corresponds to the source terminal. Further at 312, the video control equipment 301 determines which of the one or more source terminals is the target source terminal corresponding to the remote control code information. For example, the video control equipment 301 can store a mapping of control instruction information to source terminals. The mapping of control instruction information to source terminals can be used to identify source terminals that support a specific command associated with the control instruction information corresponding to remote control code information. The video control equipment 301 can use the mapping of control instruction information to source terminals as a basis for determining which of the one or more source terminals corresponds to the target source terminal corresponding to the remote control code information, or for determining whether a source terminal supports the remote control code information. In some embodiments, the video control equipment can use source information code (e.g., that identifies a source terminal or a type of source terminal) included in the remote control code information to determine the target source terminal.

In some embodiments, process 300 includes 315 (not shown) at which the video control equipment 301 detects whether the remote control code information corresponds to the video display terminal. For example, if the control instruction information corresponding to the remote control code information matches the control instruction information supported by the video display terminal, then the video control equipment 301 determines that the remote control code information corresponds to the video display terminal. If the remote control code information corresponds to the video display terminal, then the video control equipment 301 causes the control instruction information corresponding to the remote control code information to be executed on the video display terminal (e.g., by sending the remote control code or corresponding control instruction information to the video display terminal which will trigger the execution of the remote control operation).

For example, in the event that User A uses TV Remote Controller 1 to change the channel, User A presses the "Channel up one" key. Assuming that the code corresponding to the "Channel up one" key is "0x00," Smart TV1, which is paired with TV Remote Controller 1, receives the remote control code information "0x00" submitted by TV Remote Controller 1. At 311, the video control equipment 301 obtains the remote control code information "0x00" submitted by TV Remote Controller 1. For example, the video control equipment 301 obtains the remote control code information by using the API provided by STB1 itself or by receiving the remote control code information "0x00" forwarded by STB1. Then, at 315, the video control equipment 301 detects whether the remote control code information "0x00" corresponds to the video display terminal (e.g., Smart TV1). Assuming that the control instruction information (e.g., "Control Instruction 0x00") corresponding to the remote control code information "0x00" matches the control instruction information supported by the video display terminal (e.g., Smart TV1), the control instruction information corresponding to the remote control code information will, at 314, execute the "Channel one up" operation on Smart TV1.

Figure 4:
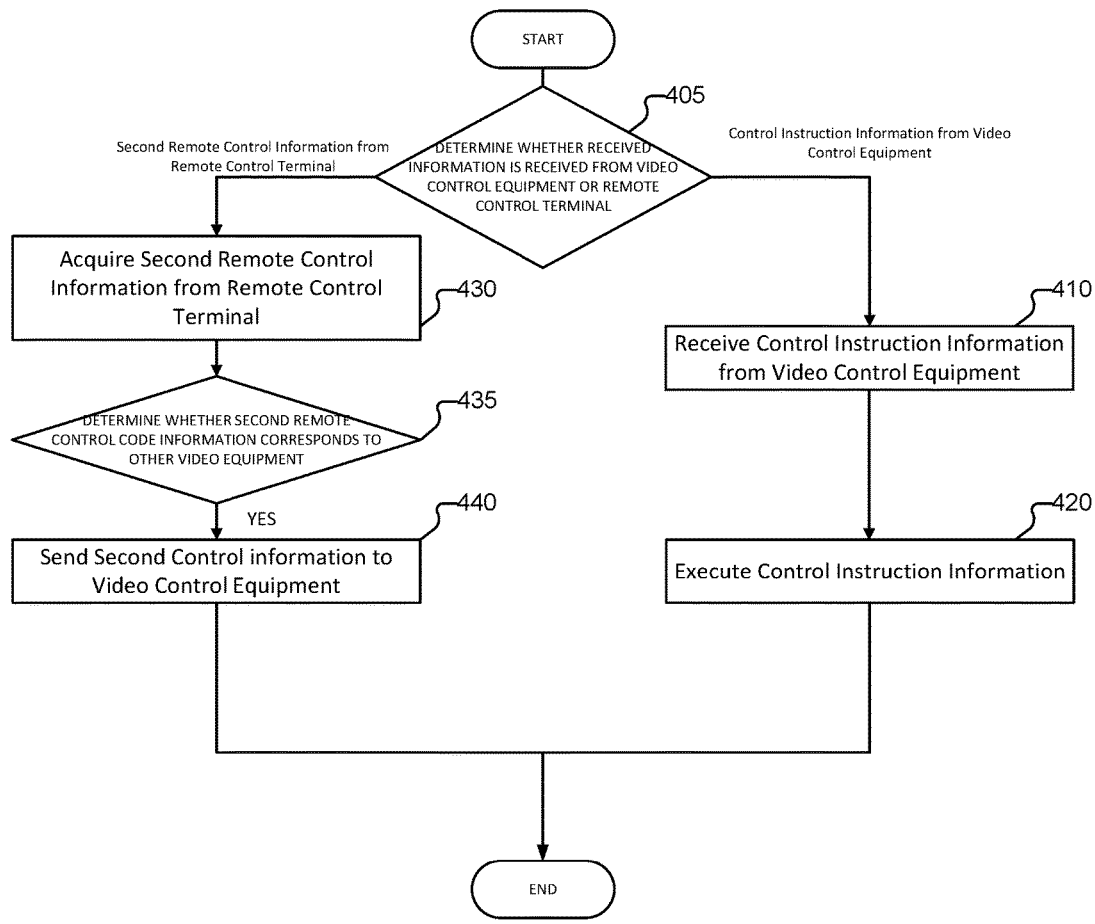
FIG. 4 is a flowchart of a method for controlling one or more source terminals according to various embodiments of the present application.

FIG. 4 is a flowchart of a method for controlling one or more source terminals according to various embodiments of the present application.

Referring to FIG. 4, process 400 for controlling one or more source terminals connected to a video display terminal is provided. Process 400 can be implemented by system 100.

At 405, information is received by video equipment (e.g., video equipment 120 of system 100), and the video equipment determines whether the received information is received from the video control equipment (e.g., whether the received information corresponds to control instruction information from the video control equipment), or from a remote control terminal (e.g., whether the received information corresponds to second remote control code information from a remote control terminal).

At 410, the video equipment (e.g., video equipment 120 of system 100) receives control instruction information that corresponds to the remote control code information submitted by the remote control terminal and that was sent by the corresponding video control equipment (e.g., video control equipment 110 of system 100).

At 420, the video equipment executes the control instruction information. In the event that the video equipment corresponds to the target source terminal, the video equipment performs an operation corresponding to the control instruction information (e.g., to control playback of media or to control the target source terminal). In the event that the video equipment does not correspond to, or otherwise include, the target source terminal, the video equipment sends the control instruction information to the target source terminal. For example, if the target source terminal is connected to the video equipment via an interface (e.g., an HDMI port), the video equipment sends the control instruction information to the target source terminal.

In some embodiments, the video equipment acquires second remote control code information from the remote control terminal. For example, the remote control terminal can be paired with the video equipment and send control code information directly to the video equipment (e.g., rather than via the video control equipment). The video equipment can acquire the second remote control code information via a direct connection with the remote control terminal or via a network over which the video equipment and the remote control terminal communicate.

At 430, the video equipment acquires second remote control code information from the remote control terminal.

In the event that the video equipment acquires the second remote control code information, at 440, the video equipment sends the second remote control code information to the video control equipment. In some embodiments, the video equipment sending the second remote control code information does not correspond to a command to control the video equipment or a target source terminal connected to the video equipment. For example, the video equipment can determine whether the second remote control code information corresponds to information intended to control the video equipment or a target source terminal connected to the video equipment. If the video equipment determines that the second remote control code information does not correspond to information intended to control the video equipment or a target source terminal, the video equipment sends the second remote control code information to the video control equipment, which in turn parses the second remote control code information, generates corresponding second control instruction information, and sends the second control instruction information to the appropriate target source terminal.

In some embodiments, at 430, the video equipment uses a source terminal paired with the remote control terminal or an API provided by the video display terminal to acquire second remote control code information submitted by the user through the remote control terminal. In some embodiments, the video equipment uses a wireless network such as WiFi to receive remote control terminal-submitted remote control code information sent from a remote control-paired source terminal or video display terminal and thereby acquires second remote control code information from the remote control terminal. In some embodiments, in the event that the video equipment is paired with the remote control terminal, the video equipment can directly receive second remote control code information issued by the remote control terminal. The second remote control code information can be the same as or different from the remote control code information received by the video equipment at 410.

For example, User A's home television network is composed of two source terminals (e.g., a set-top box (STB1), and a set-top box (STB2)), one piece of video display terminal (e.g., a smart television set (Smart TV1)), and one remote control terminal (e.g., a remote control (TV Remote Controller 1)). The remote control terminal (e.g., TV Remote Controller 1) can be paired with any one of the following: the two source terminals (e.g., STB1 and STB2) and the television display equipment (e.g., Smart TV1). For example, TV Remote Controller 1 can submit remote control code information only to the equipment with which TV Remote Controller 1 is paired. In other words, the remote control code information sent by TV Remote Controller 1 can only be received by the equipment that is paired with TV Remote Controller 1. Assuming that TV Remote Controller 1 is paired with Smart TV1 and that the video control equipment is integrated with Smart TV1, in the event that User A uses TV Remote Controller 1 to change the channel, User A presses the "Channel down one" key. Assuming that the code corresponding to the "Channel down one" key is "0x01" and that Smart TV1 paired with TV Remote Controller 1 can receive the second remote control code information "0x01" submitted by TV Remote Controller 1, and assuming that the video equipment is STB2, then the video equipment at step 430 can, through the API provided by Smart TV1 itself or by receiving the second remote control code information "0x01" forwarded by Smart TV1, obtain the second remote control code information "0x01" submitted by TV Remote Controller 1.

In various embodiments 410 and 430 are performed in serial. In various other embodiments, 410 and 430 are performed in parallel.

At 440, the video equipment sends the second remote control code information through, for example, a wireless network such as WiFi to the video control equipment.

In some embodiments, video equipment sends unified remote control code information mapped from the second remote control code information to the video control equipment. For example, continuing with the example above, the video equipment can obtain unified remote control code information by mapping the remote control code information "0x01" submitted by the TV Remote Controller 1. For example, the video equipment maps the remote control code information to unified remote control code information, such as the Android unified code. Then the video equipment sends the unified remote control code information to video control equipment. The video equipment can store mappings of remote control code information (e.g., corresponding to a remote control terminal) to unified remote control code information. The video equipment can query the mappings of remote control code information to unified remote control code information to obtain the unified remote control code information corresponding to the second remote control code information.

In some embodiments, process 400 includes 435. For example, 435 is optionally included. At 435, the video equipment detects whether the second remote control code information corresponds to the second video equipment. In the event that the second remote control code information corresponds to other video equipment, at 440, the video equipment sends the second remote control code information to the video control equipment.

Specifically, at 435, the video equipment detects whether the second remote control code information corresponds to the second video equipment. The method whereby the video equipment detects whether the second remote control code information corresponds to the second video equipment is the same as or similar to the process whereby target selector 112 in system 100 of FIG. 1 detects whether the remote control code information corresponds to the source terminal.

In the event that the second remote control code information corresponds to other video equipment, the video equipment sends the second remote control code information to the video control equipment at 440. For example, assuming that the video equipment determines that the second remote control code information "0x01" does not correspond to the video equipment at 435, the video equipment sends the second remote control code information to the video control equipment. For example, in the event that the second remote control code information "0x01" corresponds to other video equipment, the video equipment sends the second remote control code information through, for example, a wireless network such as WiFi to the video control equipment.

According to various embodiments, 405 is optionally included. For example, 410 and 420 can correspond to a first process and 430 and 440 can correspond to a second process.

Referring to FIG. 5, a computer system 500 for controlling one or more source terminals is shown. As will be apparent, other computer system architectures and configurations can be used to control one or more source terminals. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown). The memory can be a non-transitory computer-readable storage medium.

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storage device 512 and fixed mass storage 520 generally store additional programming instructions, data, and the like that typically are not in active use by the processor 502. It will be appreciated that the information retained within mass storage device 512 and fixed mass storage 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

The above are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    acquiring remote control code information submitted via a remote control terminal, the remote control code information specifying an operation to be performed;
    determining among one or more source terminals a target source terminal corresponding to the remote control code information, based at least in part on (i) a determination that a capability of at least one of the one or more source terminals matches a command associated with the remote control code information based at least in part on a result of querying a mapping of control instruction information to capabilities of one or more source terminals, wherein the mapping comprises control code information, and (ii) an identified one of the one or more source terminals contemporaneously providing an output to an output device, wherein the identified one of the one or more source terminals is identified by a video control equipment based on an input to the video control equipment made by at least one of the one or more source terminals to be identified; and sending to the target source terminal control instruction information corresponding to the remote control code information and causing the operation to be performed on the target source terminal.

2. A method, comprising:

receiving, by a video equipment, control instruction information corresponding to remote control code information submitted by a remote control terminal via a video control equipment and forwarded to the video equipment, wherein the video equipment is identified by the video control equipment based at least in part on the remote control code information, and at least in part on (i) a determination that one or more of a capability of the video equipment matches a command associated with the remote control code information based at least in part on a result of querying a mapping of control instruction information to capabilities of one or more source terminals, wherein the mapping comprises control code information, and (ii) an identification of the video equipment contemporaneously providing an output to an output device, wherein the video equipment is identified by the video control equipment based on an input to the video control equipment from the video control equipment; and executing the control instruction information.

3. The method of claim 1, further comprising:

parsing the remote control code information; and generating the control instruction information corresponding to the remote control code information, wherein the control instruction information is readable by the target source terminal.

4. The method of claim 3, further comprising:

determining a format of control instruction information used by the target source terminal, wherein the control instruction information is generated using the format of control instruction information used by the target source terminal.

5. The method of claim 1, wherein the determining among the one or more source terminals of the target source terminal corresponding to the remote control code information comprises:

using a video signal currently in use by a video display terminal connected to the one or more source terminals to determine among the one or more source terminals the target source terminal, wherein the target source terminal is a source terminal among the one or more source terminals that is providing the video signal currently in use by the video display terminal.

6. The method of claim 1, wherein the determining of which of the one or more source terminals corresponds to the target source terminal corresponding to the remote control code information comprises:

detecting whether the remote control code information corresponds to a source terminal, wherein the one or more source terminals correspond to the target source terminal corresponding to the remote control code information is determined in the event that the remote control code information corresponds to a source terminal.

7. The method of claim 6, further comprising:

detecting whether the remote control code information corresponds to a video display terminal that is connected to the one or more source terminals; and in response to a determination that the remote control code information corresponds to the video display terminal, causing the control instruction information corresponding to the remote control code information to be executed on the video display terminal.

8. The method of claim 1, wherein the acquiring of the remote control code information submitted via the remote control terminal comprises:

receiving the remote control code information from at least one of the one or more source terminals, wherein the remote control code information from the remote control terminal is received by the at least one of the one or more source terminals.

9. The method of claim 1, further comprising:

pairing the remote control terminal to video control equipment.

10. The method of claim 1, wherein the remote control code information submitted via the remote control terminal is received by video control equipment in the event that the video control equipment is paired with the remote control terminal.

11. A method, comprising:

receiving, by a video equipment, control instruction information corresponding to remote control code information submitted by a remote control terminal via a video control equipment and forwarded to the video equipment, wherein the video equipment is identified by the video control equipment based at least in part on the remote control code information, and at least in part on (i) a determination that one or more of a capability of the video equipment matches a command associated with the remote control code information based at least in part on a result of querying a mapping of control instruction information to capabilities of one or more source terminals, wherein the mapping comprises control code information, and (ii) an identification of the video equipment contemporaneously providing an output to an output device, wherein the video equipment is identified by the video control equipment based on an input to the video control equipment from the video control equipment; and executing the control instruction information.

12. The method of claim 11, wherein the video equipment is integrated with or comprised in a video display terminal or one or more source terminals.

13. The method of claim 12, wherein the video equipment is connected to one or more source terminals.

14. The method of claim 11, further comprising:

acquiring second remote control code information from the remote control terminal; and sending the second remote control code information to the video control equipment.

15. The method of claim 14, wherein the sending the second remote control code information to the video control equipment comprises:

sending unified remote control code information mapped from the second remote control code information to the video control equipment.

16. The method of claim 14, further comprising:
detecting whether the second remote control code information corresponds to the video equipment,
wherein the sending the second remote control code information to the video control equipment comprises:
in response to a determination that the second remote control code information corresponds to other video equipment, sending the second remote control code information to the video control equipment.

17. A video control equipment, comprising:
at least one processor configured to:
acquire remote control code information submitted via a remote control terminal, the remote control code information specifying an operation to be performed;
determine among one or more source terminals a target source terminal corresponding to the remote control code information based at least in part on (i) a determination that a capability of at least one of the one or more source terminals matches a command associated with the remote control code information based at least in part on a result of querying a mapping of control instruction information to capabilities of one or more source terminals, wherein the mapping comprises control code information, and (ii) an identified one of the one or more source terminals contemporaneously providing an output to an output device, wherein the identified one of the one or more source terminals is identified by the video control equipment based on an input to the video control equipment made by at least one of the one or more source terminals to be identified; and
send to the target source terminal control instruction information corresponding to the remote control code information and cause the operation to be performed on the target source terminal; and
a memory coupled to the at least one processor and configured to provide the at least one processor with instructions.

18. The video control equipment of claim 17, wherein the at least one processor is further configured to use a video signal currently in use by a video display terminal connected to the one or more source terminals as a basis for determining which of the one or more source terminals is the target source terminal corresponding to the remote control code information.

19. The video control equipment of claim 17, wherein the at least one processor is further configured to:
detect whether the remote control code information corresponds to a source terminal; and
in response to a determination that the remote control code information corresponds to the source terminal, determine which of the one or more source terminals is the target source terminal corresponding to the remote control code information.

20. The video control equipment of claim 17, wherein the at least one processor is further configured to:
receive remote control terminal-submitted remote control code information from at least one of the one or more source terminals, wherein the at least one of the one or more source terminals received the remote control code information from the remote control terminal.

21. The video control equipment of claim 17, wherein the at least one processor is further configured to pair with the remote control terminal.

22. The video control equipment of claim 21, wherein the remote control code information submitted via the remote control terminal is received by the one or more processors in the event that the video control equipment is paired with the remote control terminal.

23. A video equipment, comprising:
at least one processor configured to:
receive control instruction information corresponding to remote control code information submitted by a remote control terminal via a video control equipment and forwarded to the video equipment, wherein the video equipment is identified by the video control equipment based at least in part on the remote control code information, and at least in part on (i) a determination that a capability of the video equipment matches a command associated with the remote control code information based at least in part on a result of querying a mapping of control instruction information to capabilities of one or more source terminals, wherein the mapping comprises control code information, and (ii) an identification of the video equipment contemporaneously providing an output to an output device, wherein the video equipment is identified by the video control equipment based on an input to the video control equipment from the video control equipment; and
execute the control instruction information; and
a memory coupled to the at least one processor and configured to provide the at least one processor with instructions.

24. The video equipment of claim 23, wherein the at least one processor is further configured to:
acquire second remote control code information from the remote control terminal; and
send the second remote control code information to the video control equipment.

25. The video equipment of claim 24, wherein the at least one processor is further configured to:
send unified remote control code information mapped from the second remote control code information to the video control equipment.

26. The video equipment of claim 24, wherein the at least one processor is further configured to:
detect whether the second remote control code information corresponds to the video equipment; and
in response to a determination that the second remote control code information corresponds to other video equipment, send the second remote control code information to the video control equipment.

27. A computer program product, the computer program product being embodied in a non-transitory computer readable storage medium and comprising computer instructions for:
acquiring remote control code information submitted via a remote control terminal, the remote control code information specifying an operation to be performed;
determining among one or more source terminals a target source terminal corresponding to the remote control code information based at least in part on (i) a determination that a capability of at least one of the one or more source terminals matches a command associated with the remote control code information based at least in part on a result of querying a mapping of control instruction information to capabilities of one or more source terminals, wherein the mapping comprises control code information, and (ii) an identified one of the one or more source terminals contemporaneously providing an output to an output device, wherein the identified one of the one or more source terminals is identified by a video control equipment based on an input to the video control equipment made by at least one of the one or more source terminals to be identified; and sending to the target source terminal control instruction information corresponding to the remote control code information and causing the operation to be performed on the target source terminal.

28. The method of claim 1, wherein determining among one or more source terminals a target source terminal corresponding to the remote control code information comprises selecting the target source terminal to which to send target source terminal control instruction information corresponding to the remote control code information based at least in part on the determination that the capability of at least one of the one or more source terminals matches the command associated with the remote control code information.

29. The method of claim 1, wherein the one or more source terminals are determined to support the operation to be performed in response to a determination that the mapping of control instruction information to capabilities of the one or more source terminals comprises the control code information.

30. The method of claim 1, wherein the mapping of control instruction information to capabilities of one or more source terminals is queries based at least in part on the command associated with the remote control code information.

* * * * *